US009930548B2

(12) United States Patent
Kalderen et al.

(10) Patent No.: US 9,930,548 B2
(45) Date of Patent: *Mar. 27, 2018

(54) IDENTIFICATION OF WIRELESS COMMUNICATION CONGESTION

(71) Applicant: Verizon Patent and Licensing Inc., Arlington, VA (US)

(72) Inventors: Bjorn Olof Erland Kalderen, South Orange, NJ (US); Daniel Mindler, Somerset, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 499 days.

This patent is subject to a terminal disclaimer.

(21) Appl. No.: 14/556,778

(22) Filed: Dec. 1, 2014

(65) Prior Publication Data
US 2016/0157114 A1 Jun. 2, 2016

(51) Int. Cl.
| H04L 12/26 | (2006.01) |
| H04W 24/08 | (2009.01) |
| H04L 12/24 | (2006.01) |
| H04W 28/02 | (2009.01) |
| H04L 12/801 | (2013.01) |
| H04L 12/825 | (2013.01) |

(52) U.S. Cl.
CPC .......... *H04W 24/08* (2013.01); *H04L 41/147* (2013.01); *H04L 41/5009* (2013.01); *H04L 47/127* (2013.01); *H04L 47/26* (2013.01); *H04W 28/0247* (2013.01); *H04W 28/0284* (2013.01)

(58) Field of Classification Search
CPC ...................................... H04W 24/08
USPC ......................................... 370/252
See application file for complete search history.

(56) References Cited

U.S. PATENT DOCUMENTS

| 2011/0237238 | A1* | 9/2011 | Hassan | H04W 16/14 455/422.1 |
| 2013/0021933 | A1* | 1/2013 | Kovvali | H04W 28/0236 370/252 |
| 2013/0046879 | A1* | 2/2013 | Garcia | H04L 43/0811 709/224 |
| 2013/0322242 | A1* | 12/2013 | Swenson | H04L 47/11 370/232 |

* cited by examiner

*Primary Examiner* — Christopher R Crompton

(57) ABSTRACT

Near real time identification of predicted wireless communication congestion is based on a relationship between a number of key performance indicator (KPI) trend prediction values and corresponding KPI trend thresholds. Each KPI trend prediction value is calculated based on a number of past intervals and a number of KPIs corresponding to each past interval of the number of past intervals utilizing linear regression. A mobile communication network node, such as an enhanced node B, may identify predicted wireless communication congestion and notify mobile devices served by the node. Mobile devices served by the node, based on the notification, may restrict background application data communication and/or take appropriate action to contribute to a reduction in and/or elimination of the congestion.

20 Claims, 9 Drawing Sheets

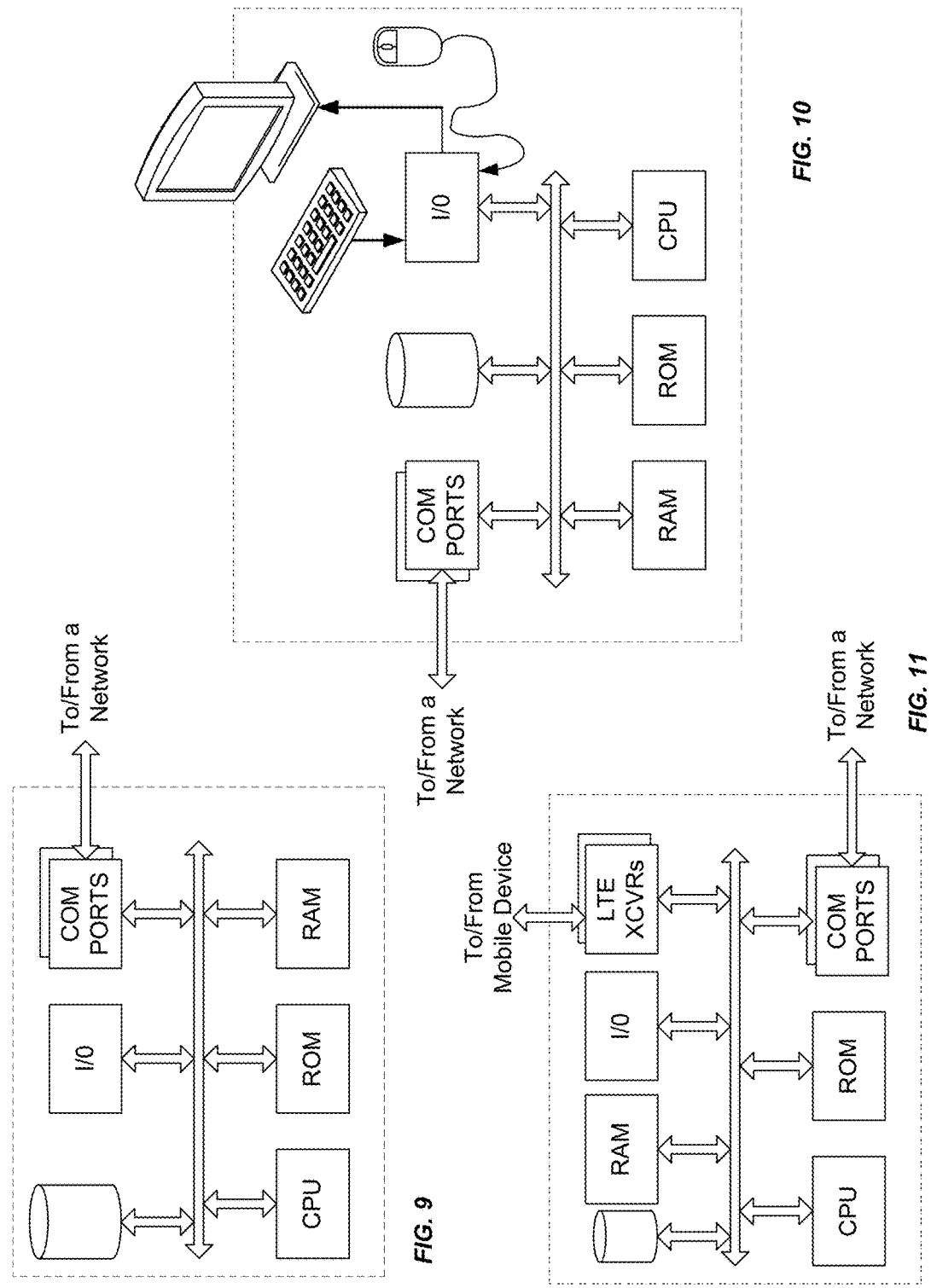

IDENTIFICATION OF WIRELESS COMMUNICATION CONGESTION

BACKGROUND

In recent years, smartphones have become very popular. Communications via a network may be responsive to a user's current operation of the mobile device. Also, many smartphone applications run in the background and generate data communications while the user operates the device for other purposes or is not actively using the device at all.

Smartphone users, however, may experience slow service and/or dropped calls when wireless network congestion exists. Wireless network congestion may occur, for example, when unanticipated high concentration of smartphone users in the same proximity leads to multiple applications of multiple smartphones attempting to establish data communications, even without user intervention. Typically, wireless network congestion is determined by the wireless network; and attempts to relieve the wireless network congestion involve the wireless network rejecting successive requests to establish data communications or calls. This response by the wireless network generates additional load on the wireless network and may, at least initially, exacerbate the wireless network congestion.

BRIEF DESCRIPTION OF THE DRAWINGS

The drawing figures depict one or more implementations in accord with the present teachings, by way of example only, not by way of limitation. In the figures, like reference numerals refer to the same or similar elements.

FIG. 9 provides a block diagram of a general purpose computer hardware platform that may be configured as a host or server, for example, to function as any of the server computers or wireless network nodes shown in FIG. 3.

FIG. 10 is a simplified functional block diagram of a personal computer or other work station or user terminal device.

FIG. 11 is a simplified functional block diagram of a wireless network node, such as an evolved node B found in the system of FIG. 3.

DETAILED DESCRIPTION OF EXAMPLES

Figure 1:
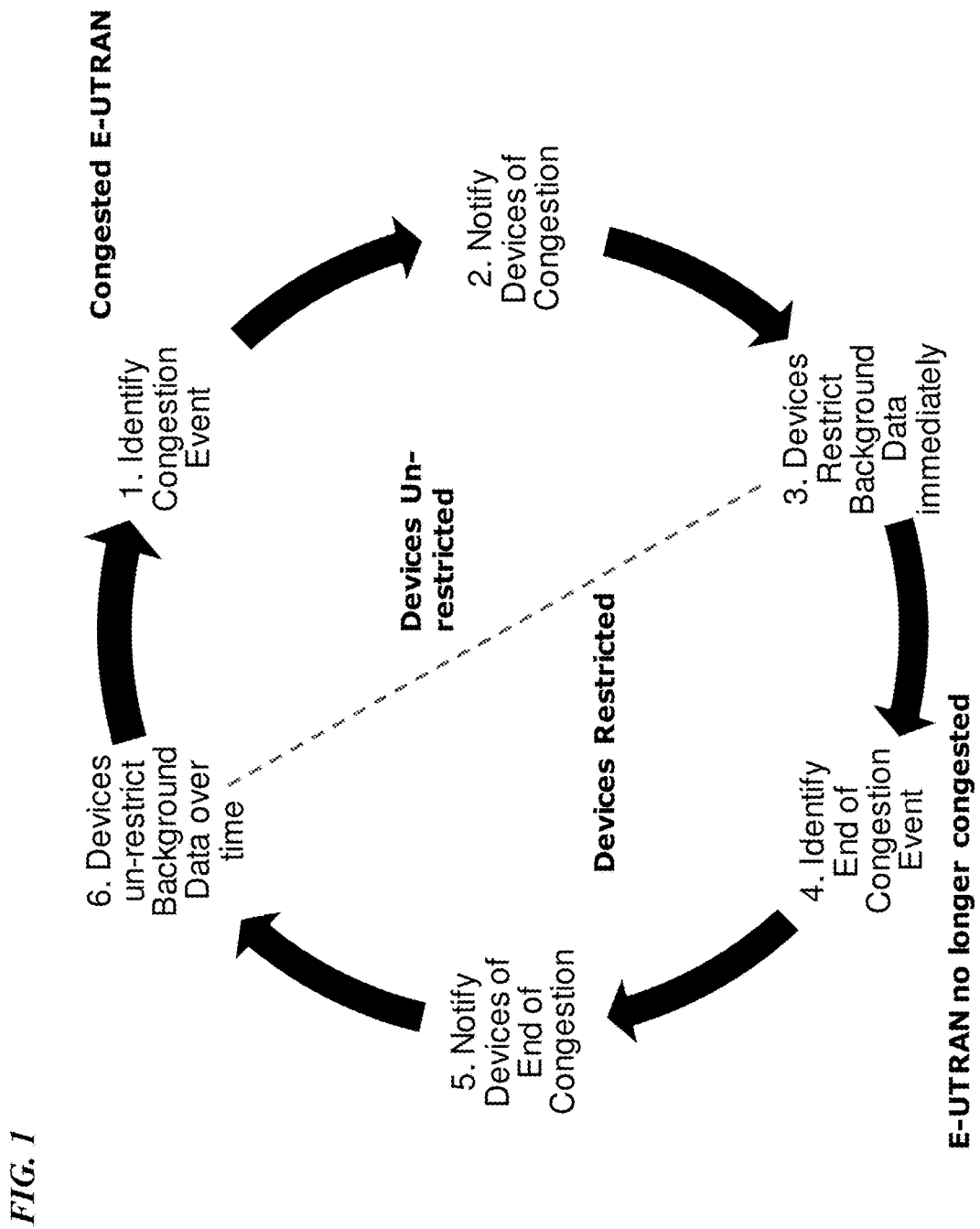
FIG. 1 is a high-level life-cycle diagram of an example of operations of mobile devices and a mobile communication network, during a period of congestion followed by a period of no congestion.

In the following detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings.

Heavy usage of mobile network resources causes congestion that can result in slow service and/or dropped calls. Many applications on smartphones run in the background, even when users are not actively operating the mobile devices; and many of the background activities involve data communications, which can contribute to network congestion. For example, many applications periodically check with a server to obtain notifications that the application will offer to the user, e.g. as news updates. As another example, applications periodically check with a server for software updates. When the device is actively operated by the user, these background data communication functions often consume a minority of network resources. However, under some circumstances, they may still exacerbate network congestion. For example, when a large crowd with smartphones are gathered in a relatively small geographic area, e.g. in a sports venue, the large number of mobile devices requesting and/or receiving background communications through one or a small number of network nodes may cause significant loading on the affected network resources. Users actively seeking service, e.g. to make voice calls or obtain specifically requested information, may experience service delays or even dropped calls. In order to accommodate these (very limited) times of peak demand, the network operator may need to deploy additional stationary resources (e.g., towers or base stations) that remain unused at other periods of time (which may typically represent as much as 95% of the time) and are thus essentially wasted.

Although background application data communication may contribute to wireless communication congestion, background application data communication is not the only source of wireless communication congestion. While restricting background application data communication may, for example, reduce wireless communication congestion, restricting other types of communication by a mobile device may also have a similar result. Likewise, informing a user of a mobile device of predicted wireless communication congestion may prompt a change in that user's behavior as it relates to the mobile device and wireless communication. As such, the ability to identify predicted wireless communication congestion within a short period of time (e.g., several minutes) based on current and recent wireless communication with a mobile network node may allow the network node and/or one or more mobile devices served by the network node to take action to reduce and/or end the wireless communication congestion in the near future. Subsequent notification of a reduction in, or end to, congestion allows return to normal operations.

In general, a need exists for a mobile network node, such as an enhanced node B, that may identify in near real time when wireless communication congestion exists and notify a mobile device, such as a smartphone, to adjust its data communications, for example, in a manner that may help to reduce network congestion yet not substantially reduce the user's enjoyment of many of the desirable functions of the device.

In one example, the mobile device is instructed to restrict background application data communications during a period of identified wireless communication congestion. In a further example, upon identification that wireless communication congestion no longer exists, the mobile device is instructed to re-enable background application data communications. Instructing the mobile device to activate/deactivate a background application data communication restriction is one example of utilizing the identification of predicted wireless communication congestion. Other examples include restricting all non-voice or even non-emergency communication, limiting one or more types of communication (e.g., voice, data), or simply providing a notification to mobile device users of the predicted wireless communication congestion. However, to effectively impact future wireless communication in a positive manner, any identification of predicted wireless communication congestion needs to be in near real time or within a short period of time of current and recent wireless communication.

As such, the examples described below implement techniques for near real time identification of wireless communication congestion as well as reduction and/or elimination of such congestion. Furthermore, the examples described below implement techniques for notifying a mobile device of such identification and/or instructing the mobile device to enable or disable a background application data communication restriction based on such identification.

Reference now is made in detail to the examples illustrated in the accompanying drawings and discussed below.

By way of an example of an application of congestion detection, FIG. 1 depicts a life-cycle for background application data communication operations of mobile devices and a mobile communication network during a period of wireless communication congestion followed by a period of limited or no wireless communication congestion. In an initial example, mobile devices are able to utilize wireless communication without any restrictions related to congestion within the mobile communication network. At 1, a predicted wireless communication congestion event is identified. For example, a relatively large number of mobile devices located in the same area (e.g., mobile devices in a common venue) attempt to utilize wireless services provided by one or a small number of network nodes of a mobile communication network at the same time or during a relatively short period of time.

As described in greater detail below, predicted wireless communication congestion is identified at 1, for example, within the network. In one example of an applicable congestion detection procedure, performance measurements are received from a performance manager within a base station (e.g., enhanced node B or eNodeB) and key performance indicators (KPIs) are obtained. At least one KPI, in the example, is calculated based on the received performance measurements. Based on a number of past intervals (e.g., short periods of time, such as 15 minutes) and the KPIs corresponding to each past interval, KPI trend prediction values are calculated in the example. Predicted wireless communication congestion is identified, for example, based on the relationship between a number of the calculated KPI trend prediction values and corresponding KPI trend threshold values.

Hence, in the example, at 2, mobile devices are notified of the predicted wireless communication congestion. In one example, a congestion flag is enabled within a control message delivered from the mobile communication network to the mobile devices. In a further example, the control message is a system information broadcast 2 (SIB2) message. The SIB2 message is, for example, a control message used by a base station to provide operational information to a mobile device. The control message with an enabled congestion flag serves, for example, as an instruction to the mobile device to activate a background application data communication restriction and/or take some other appropriate action. At 3, mobile devices receiving the notification of predicted wireless communication congestion take some action based on the notification. For example, mobile devices activate the background application data communication restriction in response to the congestion notification. Alternatively, or in addition, mobile devices, for example, inform users of the predicted wireless communication and/or take some other appropriate action to reduce an amount of wireless communication. With the background application data communication restriction activated, for example, the relatively large number of mobile devices located in the same area are each unable to utilize background application data communication. Network performance continues to be monitored while the restriction is active. As a result of the background application data communication restriction and/or other action taken by mobile devices (and/or for other reasons), wireless communication congestion is later reduced and/or ends; and, at 4, a prediction of the reduction and/or end of wireless communication congestion is identified. As described in greater detail below, the prediction of the reduction and/or end of wireless communication congestion is identified, for example, in a similar fashion to the identification of predicted wireless communication congestion at 1 above, e.g., based on the relationship between subsequently calculated KPI trend prediction values and corresponding KPI trend threshold values.

In turn, at 5, mobile devices are notified of the prediction of the reduction and/or end of wireless communication congestion. In one example, a congestion flag is disabled within a control message delivered from the mobile communication network to the mobile devices. The later control message with a disabled congestion flag serves, for example, as an instruction to the mobile device to deactivate the background application data communication restriction and/or take some other appropriate action. At 6, each individual device independently calculates an amount of time to wait and deactivates the background application data communication restriction after waiting the calculated amount of time. Due to the independently calculated wait time, the mobile devices reactivate and resume background data communication at somewhat different intervals, to avoid new congestion due to all restarting at about the same time.

Figures 2A, 2B:
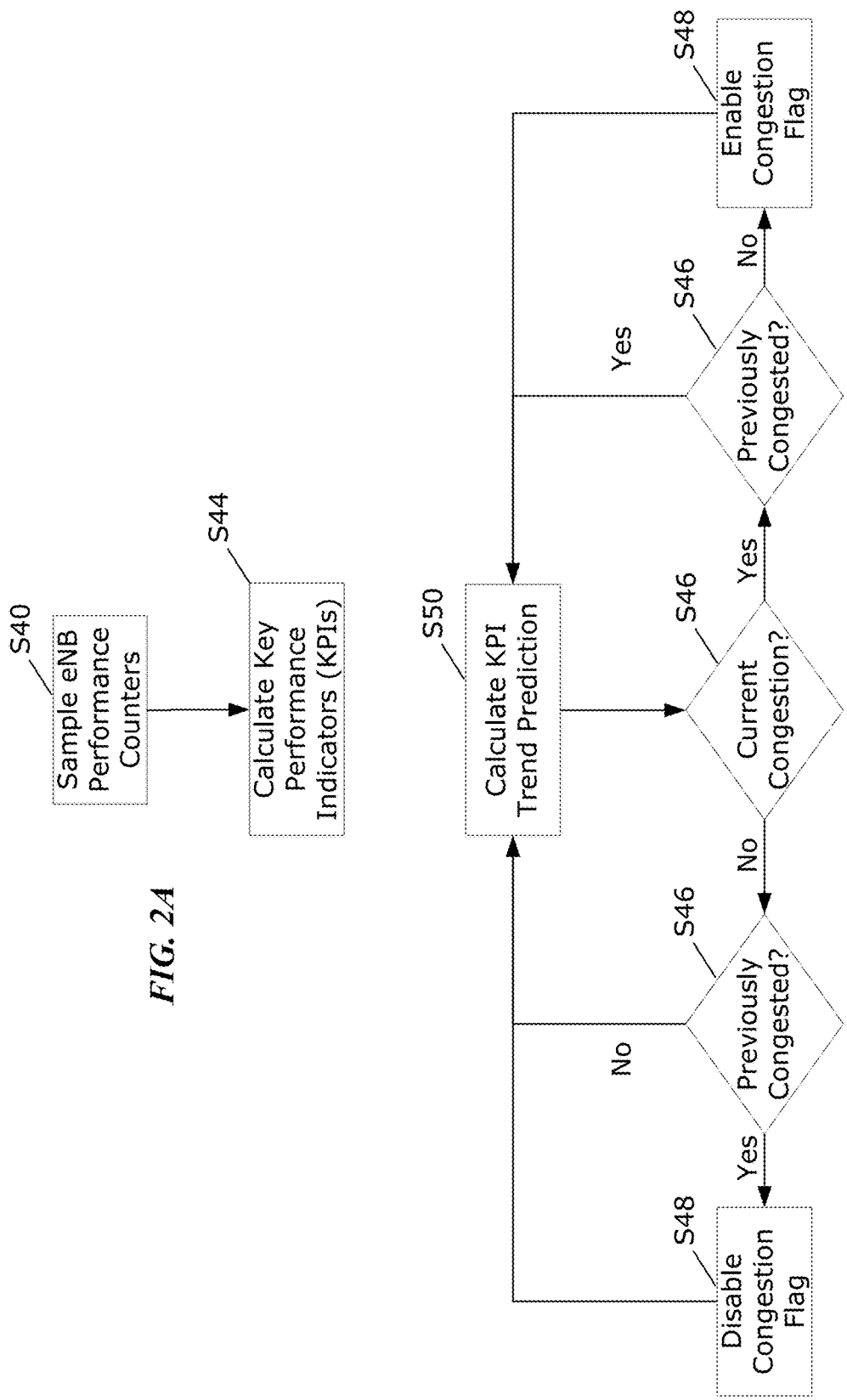
FIG. 2A is a process diagram depicting an example of a process of sampling performance of a mobile communication network and calculating one or more key performance indicators.
FIG. 2B is a process diagram depicting an example of a process of calculating a key performance indicator trend prediction and determining whether wireless communication congestion exists based on the prediction.

FIG. 2A depicts a process of sampling performance of a mobile communication network and calculating one or more key performance indicators. In step S20, performance counters or measurements of a node of the mobile communication network, such as an enhanced node B (eNodeB or eNB) or other type of base station, are sampled. The performance measurements include, for example, a total radio resource control (RRC) connection failure (RRCF) value, a total RRC connection success (RRCS) value, and a total RRC connected user (RRCC) value. The RRCF value represents, for example, a total number of RRCF events experienced by the base station during a sample interval. The RRCS value represents, for example, a total number of RRCS events experienced by the base station during the sample interval. The RRCC value represents, for example, a total number of mobile devices wirelessly connected to the base station during the sample interval. In one example, the performance measurements are sampled by a performance manager within the base station which delivers the sampled performance measurements to a wireless communication congestion detector, although the performance manager could be implemented as a separate hardware element or as a function on another type of network connected device. The wireless communication congestion detector is, for example, within and/or coupled to the base station, although the detector could similarly be implemented as a standalone element or on another network connected device.

In step S22, key performance indicators (KPIs) for the sample interval are obtained, with at least one of the KPIs being calculated based on the sampled performance measurements. The KPIs include, for example, a maximum number of RRCC (RRCM) value, a RRCF rate for the sample interval, and a RRC utilization rate for the sample interval. In one example, the RRCF rate is calculated as (RRCF/(RRCF+RRCS))*100. In a further example, the RRC utilization rate is calculated as (RRCC/RRCM)*100. The RRCM is, for example, a fixed maximum number of mobile devices to which the base station is capable of providing wireless connections.

Although FIG. 2A depicts the process of sampling performance measurements and obtaining corresponding KPIs as two steps, the process is repeated, for example, at repetitive intervals such that multiple samples of performance measurements and corresponding KPIs are generated (e.g., sampled performance measurements and corresponding KPIs for interval 1, sampled performance measurements and corresponding KPIs for interval 2, . . . sampled performance measurements and corresponding KPIs for interval n). In one example, each repetitive interval is a fixed length of time (e.g., 15 minutes per interval). Alternatively, each repetitive interval is, for example, a variable length of time (e.g., more frequently during business hours or periods of otherwise heavy usage, less frequently during overnight hours or periods of otherwise low usage). Through this repeated process, sampled performance measurements and corresponding KPIs are generated covering a period of time, including both the present and recent past.

FIG. 2B depicts a process of calculating KPI trend prediction values and determining whether or not wireless communication congestion exists. In step S24, KPI trend prediction values are calculated. Each KPI trend prediction value represents, for example, a predicted future KPI value based on a number of past intervals and the KPIs corresponding to each past interval of the number of past intervals. The KPI trend prediction values that are used for congestion related predictions include, for example, a RRCF rate trend prediction value, a RRC utilization trend prediction value, and a downlink calculated physical resource block (PRB) load (DLPRBU) trend prediction value.

In one example, each KPI trend prediction value is calculated based on a linear regression. Linear regression allows, for example, a future value to be predicted based on a collection of some number of past values. In this example, the linear regression is based on the formula $|\alpha|*(n+\Delta)+\beta$. The elements of the formula, for example, are:

$$\alpha = \left[ n * \sum_{i=1}^{n}(x_i y_i) - \left(\sum_{i=1}^{n}(x_i) * \sum_{i=1}^{n}(y_i)\right) \right] / \left( n * \sum_{i=1}^{n}(x_i^2) - \left(\sum_{i=1}^{n}(x_i)\right)^2 \right)$$

representing a slope of calculated KPI trend prediction values;

$$\beta = \left[ \sum_{i=1}^{n}(y_i) - \left(\alpha * \sum_{i=1}^{n}(x_i)\right) \right] / n$$

representing an offset;

n is the number of past intervals;

x is an ordinal value representing a position of each interval of the number of past intervals in a series of the number of past intervals;

y is each one KPI corresponding to the KPI trend prediction value being calculated (e.g., RRCF rate when calculating RRCF trend prediction, RRC utilization when calculating RRC utilization trend prediction, DLPRBU when calculating DLPRBU trend prediction) and corresponding to each interval (e.g., RRCF rate for interval 1, RRCF rate for interval 2 . . . RRCF rate for interval n) of the number of past intervals; and $\Delta$ is 2 if $\alpha \geq 0$ or 1 if $\alpha < 0$.

In one scenario, for example, performance of a mobile communication network is measured during a major athletic sporting event for one or more base stations serving the event venue and predicted wireless communication congestion of the base station(s) is identified. In this scenario, performance is sampled, for example, every 15 minutes and KPI trend prediction values are calculated, for example, for a one hour period (e.g., n=4). Furthermore, this scenario presents the calculation related only to the RRCF rate and RRCF rate trend prediction value, although similar calculations would be performed for other KPI trend prediction values.

The following table presents the RRCF rate (e.g., calculated KPI) for each 15 minute interval within a one hour time period. The table also presents some of the calculated elements of the linear regression formula, for simplicity only.

TABLE 1

| Time | X | ΣX | Y | (X*Y) |
|---|---|---|---|---|
| 18:15 | 1 | | 1.6 | 1.6 |
| 18:30 | 2 | | 0.9 | 1.8 |
| 19:00 | 3 | | 2.2 | 6.6 |
| 19:15 | 4 | | 24.3 | 97.2 |
| | | 10.0 | | 107.2 |

The following table presents the remaining calculated elements of the linear regression formula, for simplicity only.

TABLE 2

| a<br>$n*\Sigma (X*Y)$ | b<br>$\Sigma X*\Sigma Y$ | c<br>$(x)^2$ | d<br>$n*\Sigma(x)^2$ | e<br>$(\Sigma(x))^2$ | f<br>$\Sigma Y$ | $\alpha*\Sigma X$ |
|---|---|---|---|---|---|---|
| | | 1.0 | | | | |
| | | 4.0 | | | | |
| | | 9.0 | | | | |
| | | 16.0 | | | | |
| 428.5 | 289.7 | 30.0 | 120.0 | 100.0 | 29.0 | 69.4 |

The following table presents the calculation of one KPI trend prediction value (e.g., RRCF trend prediction value) based on the values from Tables 1-2.

TABLE 3

| | Formula | Calculated Element (a-f from Table 2) | Result |
|---|---|---|---|
| n = number of samples | 4 | | |
| Slope $\alpha$ | $[n* \Sigma(xy) - (\Sigma(x)*\Sigma(y)]/(n* \Sigma(x^2) - (\Sigma(x))^2$ | (a - b)/(c - d) | 6.939 |
| $\beta$ intercept | $[\Sigma(y) - (\alpha* \Sigma(x)]/n$ | (e - f)/n | -10.105 |
| Y Trend value (for $\Delta$ = 1) | $\alpha *x + \beta$ | $(\alpha * n) + \beta$ | 17.651 |
| Y Predicted Trend value (for $\Delta$ = 2) | $\alpha *(x + \Delta) + \beta$ | $(\alpha * (n + \Delta)) + \beta$ | 31.529 |

Based on Tables 1-3 above, it can be seen that the RRCF trend prediction value is 31.529, based on the slope a being greater than 0 (e.g., 6.939). Thus, the RRCF rate is predicted to increase over the next 30 min based on the RRCF rates of the last hour. While each calculated KPI trend prediction value provides a prediction for how each KPI will change in the future, a single KPI trend prediction value is not, for example, an identification of wireless communication congestion. Instead, a single KPI trend prediction value, in conjunction with one or more other KPI trend prediction values, may provide an identification of wireless communication congestion based on the overall performance of the base station(s). Utilizing multiple KPI trend prediction values to identify predicted wireless communication congestion provides, for example, an advantage of accounting for multiple aspects of the performance of the base station(s). Furthermore, utilizing KPI trends, as opposed to KPIs or performance measurements, to identify predicted wireless communication congestion provides, for example, an advantage of accounting for changes in performance over time and thereby tends to reduce or eliminate rapid repeated transition between detections of congested and uncongested states as might occur if detection utilized instantaneous metrics.

In step S26 of FIG. 2B, it is determined whether or not wireless communication congestion is currently predicted to exist. As mentioned above and described in greater detail below in relation to FIGS. 4-5, a relationship between a number of KPI trend prediction values and corresponding KPI trend threshold values is evaluated. For example, a first relationship between a first KPI trend prediction value (e.g., RRCF rate trend prediction value) and a first KPI trend threshold value (e.g., RRCF rate trend threshold value) as well as a second relationship between a second KPI trend prediction value (e.g., RRC utilization trend prediction value) and a second KPI trend threshold value (e.g., RRC utilization trend threshold value) are evaluated. If, in this example, the first relationship meets a predetermined criteria and the second relationship meets a predetermined criteria, then wireless communication congestion is predicted to exist. Otherwise, a reduction and/or end of wireless communication congestion is predicted to exist.

If, in step S26, it is determined that wireless communication congestion is predicted to exist, the process proceeds to step S28. In step S28, it is determined whether or not wireless communication congestion was predicted to exist during an immediately preceding iteration of this process (e.g., currently predicted wireless communication congestion is a continuation of wireless communication congestion). That is, it is determined whether a change has occurred in the state of predicted wireless communication congestion. If yes, e.g., current prediction is continuation of existing congestion or there is no change in the state of predicted congestion, then the process returns to step S24. If no, e.g., current prediction is a new identification or there is a change in the state of predicted congestion, then the process proceeds to step S30 where, for example, a congestion flag within a control message is enabled. As part of step S30, the control message with the enabled congestion flag is sent to mobile devices currently being served by the base station as a notification of the predicted wireless communication congestion. The process then returns to step S24.

If, in step S26, it is determined that wireless communication congestion is not predicted to exist, the process proceeds to step S32. In step S32, it is determined whether or not wireless communication congestion was predicted to exist during an immediately preceding iteration of this process (e.g., currently predicted reduction in and/or end of wireless communication congestion is a change from previous wireless communication congestion). That is, it is determined whether a change has occurred in the state of predicted wireless communication congestion. If no, e.g., current prediction is a continued reduction in, or end of, congestion or there is no change in the state of predicted congestion, then the process returns to step S24. If yes, e.g., current prediction is a change from immediately preceding identification or there is a change in the state of predicted congestion, then the process proceeds to step S34 where, for example, a congestion flag within a control message is disabled. As part of step S34, the control message with the disabled congestion flag is sent to mobile devices currently being served by the base station as a notification of the predicted reduction and/or end of wireless communication congestion. The process then returns to step S24.

Although FIG. 2B depicts the process of calculating KPI trend prediction values and determining whether wireless communication congestion exists as a fixed set of steps, the process is repeated, for example, after a number of sample intervals such that subsequent predictions of wireless communication congestion are calculated over a period of time. In one example, the process of FIG. 2A is performed every 15 minutes. In this example, the process of FIG. 2B is performed every 1 hour (e.g., n=4). By sampling performance every 15 minutes and calculating KPI trends every hour (based on the most recent samples taken during each hour), for example, wireless communication congestion is identified in near real time or over a short period time of current and recent wireless communication. Congested/uncongested states, however, are not necessarily detected or reported on an instantaneous basis (e.g., not at intervals of a second or less), which might lead to unduly frequent changes in the state of the restriction. As such, rolling predictions (e.g., a current prediction updated with each subsequent interval) of wireless communication congestion based on a collection of recently sampled performance measurements and corresponding KPIs are calculated, thus allowing improved management of the mobile communication network.

While the examples of FIGS. 2A-2B are focused on sampling network related performance statistics directly, this is only for simplicity. Other factors indirectly related to network performance that allow for repetitive sampling over a period of time, such as the time of day, weather or other environmental conditions, and have, at least indirectly, an impact on network performance may also be utilized. For example, if users have a tendency to increase network usage when environmental conditions are more favorable (e.g., not too hot and not too cold) and decrease network usage when environmental conditions are less favorable (e.g., too hot or too cold), then such environmental conditions could be sampled over time in order to calculate a corresponding KPI trend.

Figure 3:
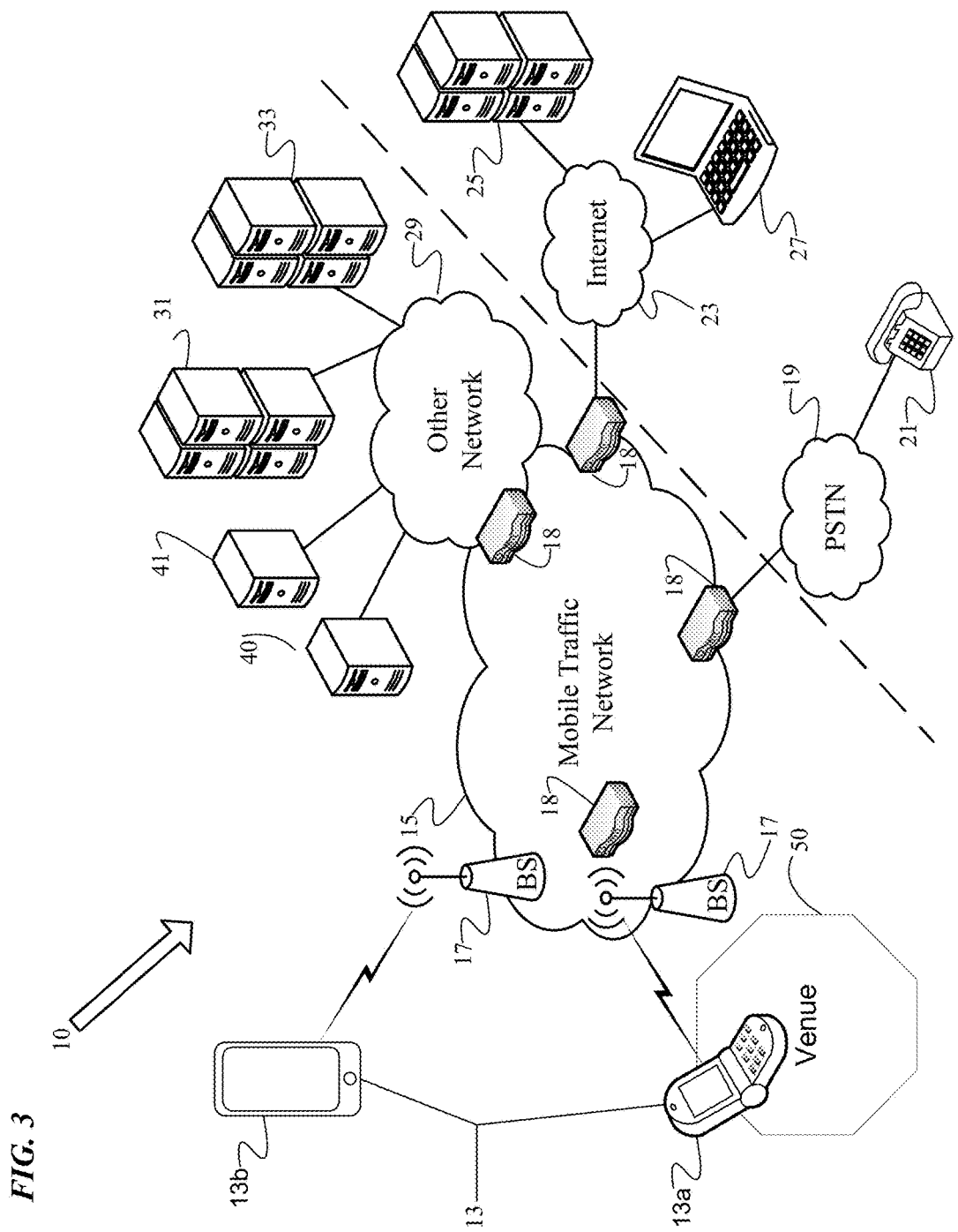
FIG. 3 is a high-level functional block diagram of an example of a system of networks/devices that provide various communications for mobile devices and support an example of near real time identification of wireless communication congestion.

FIG. 3 illustrates a system 10 offering a variety of mobile communication services, including communications for wireless data by mobile devices 13 of various users. The example shows simply two mobile devices 13a and 13b as well as a mobile communication network 10. The devices 13a and 13b are examples of mobile devices that may be instructed to activate a background application data communication restriction and/or otherwise be notified of predicted wireless communication congestion identified in near real time. However, the network will provide similar communications for many other similar users as well as for mobile devices/users that do not participate in background application data communication restriction. The network 10 provides mobile wireless communications services to those devices as well as to other mobile devices (not shown), for example, via a number of base stations (BSs) 17. In a 4G LTE network implementation, for example, the base stations are implemented by equipment identified as eNodeBs. The present techniques may be implemented in any of a variety of available mobile networks 10 and/or on any type of mobile device compatible with such a network 10, and the drawing shows only a very simplified example of a few relevant elements of the network 10 for purposes of discussion here.

The wireless mobile communication network 10 might be implemented as a network conforming to the code division multiple access (CDMA) IS-95 standard, the 3rd Generation Partnership Project 2 (3GPP2) wireless IP network standard or the Evolution Data Optimized (EVDO) standard, the Global System for Mobile (GSM) communication standard, a time division multiple access (TDMA) standard, a 4G long term evolution (LTE) standard or other standards used for public mobile wireless communications. Although various network architectures may be used to form the network, the drawing shows an arrangement using one or more wireless access networks 15 and a core network 16, operated by one mobile carrier. Hence, the illustrated system example includes a mobile communication network 10, in this case, operated in accordance with 4G LTE standards. Mobile network 10 may provide mobile telephone communications as well as Internet data communication services. For example, mobile network 10 may connect to the public switched telephone network (PSTN, not shown) and public packet-switched data communication networks such as the Internet 23 via packet data gateway (PGW) 54. Data communications via mobile network 10 provided for users of mobile devices 13 may support a variety of services such as communications of text and multimedia messages, e-mail, web browsing, streaming or downloading content, etc. with network connected equipment such as a server 25 and/or laptop computer 27 in the drawing. Voice communication also may involve transport via the Internet 23 using voice over Internet Protocol (VoIP) technologies.

The mobile communication network 10 may further provide communication services to mobile devices 13 that are located within a venue 50. In the example of FIG. 3, mobile device 13a is located within venue 50 and mobile device 13b is not located within venue 50 although at other times they may both be in the venue 50 (with other mobile devices). This, however, is only for simplicity. Venue 50 may be, for example, a sports arena or stadium. Venue 50 may, for example, have capacity for a large number of users of mobile devices 13. Such large number of mobile devices 13 within close geographical proximity served by a common one or more of the base stations 17 might exceed the planned capacity of the serving base station(s) and may cause wireless communication congestion on at least a portion of the mobile communication network 15. The wireless communication congestion on the mobile communication network 15 caused by the large number of mobile devices 13 may result in slow service and/or dropped calls for those devices at the venue 50 and possibly in some surrounding areas.

The illustrated system 10 can be implemented by a number of interconnected networks. Hence, the overall network 10 may include a number of wireless access networks 15, as well as regional ground networks interconnecting a number of wireless access networks and a wide area network (WAN) interconnecting the regional ground networks to core network elements. A regional portion of the network 10, such as that serving mobile devices 13, can include one or more wireless access networks 15 and a regional packet switched network and associated signaling network facilities. The mobile devices 13 may be capable of voice telephone communications through the network 10; and, for background application data communication restriction, the examples of devices shown at 13a and 13b are capable of data communications through the particular type of network 10 (and the users thereof typically will have subscribed to data service through the network).

Physical elements of a 4G LTE wireless access network 15 include a number of nodes referred to as eNodeBs represented in the example by eNodeBs 17. Although not separately shown, such an eNodeB can include a base transceiver system (BTS), which can communicate via an antennae system at the site of eNodeB and over the airlink with one or more mobile devices 13, when any mobile device is within range. Each eNodeB can include a BTS coupled to several antennae mounted on a radio tower within a coverage area often referred to as a "cell." The BTS is the part of the radio network that sends and receives RF signals to/from the mobile device 13 that is served by eNodeB 17. Such eNodeBs 17 operate in accordance with the more modern LTE network standard, sometimes referred to as 4G and/or 4G LTE. Packet routing and control functions may be implemented in packet routers and/or associated server platforms in the wireless access network or in many cases in elements of an IP Multimedia Service (IMS) core network 51 coupled to some number of 4G wireless access networks 15 via core network 16, although such routing and control element(s) are generically included in the broad class of devices that may be used to implement the network functionality discussed here.

The wireless access network 15 interconnects with the core traffic network represented generally by the cloud at 16 via a serving packet gateway (SGW) 56, which carries the user communications and data for the mobile device 13 between an eNodeB 17 and other elements with or through which the mobile devices communicate. The networks can also include other elements that support functionality such as messaging service messages and voice communications. Specific elements of the network 16 for carrying the voice and data traffic and for controlling various aspects of the calls or sessions through the network 16 are omitted here for simplicity. It will be understood that the various network elements can communicate with each other and other aspects of the illustrated system 10 and other networks (e.g., the PSTN (not shown) and the Internet 23) either directly or indirectly.

Mobile devices 13 can take the form of portable handsets, smart-phones or personal digital assistants, although they may be implemented in other form factors. Program applications, including an application to assist in background application data communication restriction and/or any application purchased via an on-line service can be configured to execute on many different types of mobile devices 13. For example, a mobile device application can be written to execute on a binary runtime environment for mobile (BREW-based) mobile device, a Windows Mobile based mobile device, Android, iOS for iPhone or iPad, Java Mobile, or RIM based mobile device such as a BlackBerry or the like. Some of these types of devices can employ a multi-tasking operating system.

A mobile device 13 communicates over the air with an eNodeB 17 and through the traffic network 16 for various voice and data communications, e.g. through the Internet 23 with a server such as the application server 25. Such communication may be in response to a user interacting with an application, e.g. a web browser. Alternatively, the communication may be in response to an application operating without current user interaction, e.g. a social networking application requesting or receiving a status update. While an application is operating without current user interaction, the application may be referred to, for example, as a background application; and the corresponding communication is referred to, for example, as background application data communication. Servers such as 25 may provide any of a variety of common application or service functions in response to data communication (e.g., background application data communication) originating from an application program (e.g., background application) running on the mobile device 13. For a given service, including notification of wireless communication congestion identified in near real time, an application program within the mobile device may be considered as a 'client' and the programming at 25 may be considered as the 'server' application for the particular service.

Mobile network 16 includes one or more mobility management entities (MMES) 52 with which the PGW 54 interacts to establish communications between mobile device 13 and eNodeB 17. In the core traffic network 16, the MME 52 provides control and management functionality while SGW 56 performs data routing between mobile device 13 and PGW 54 (e.g., call data during a VoLTE call).

If the mobile service carrier utilizes background application data service restriction based on near real time identification of wireless communication congestion, as described in greater detail below, such congestion identification may be performed by a wireless communication congestion detector (not shown) within and/or coupled to eNodeB 17. Alternatively, or in addition, such wireless communication congestion detector is, for example, within and/or coupled to MME 52. In one example, eNodeB 17 identifies predicted wireless communication congestion and notifies mobile device 13 of such predicted congestion. Such notification of predicted congestion, in this example, serves as an instruction to mobile device 13 to activate a background application data communication restriction. In an additional example, eNodeB 17 identifies a predicted reduction in and/or end of wireless communication congestion and notifies mobile device 13 of such predicted reduction and/or end of congestion. Such notification of the predicted reduction and/or end of congestion, in this additional example, serves as an instruction to mobile device 13 to deactivate the background application data communication restriction. When predicted wireless communication congestion exists, functions of applications running only in the background of mobile device 13 can be restricted. Even with such a restriction active, functions that are actively supporting current user operation of the device (e.g. operating in the foreground) are allowed access to network communication service(s). The foreground functions, for example, may be voice calls, mobile text or multimedia messaging, and/or data functions or applications actively selected by the user.

Figure 4:
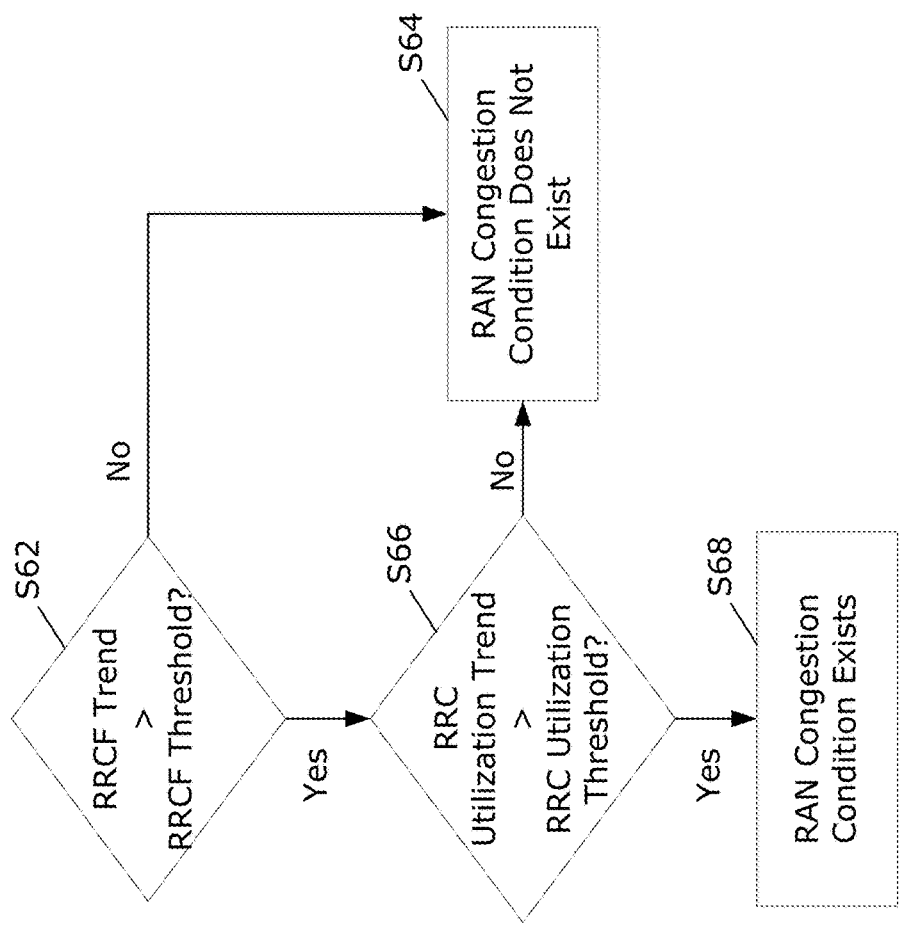
FIG. 4 is a process diagram depicting an example of a process performed to determine whether wireless communication congestion exists.
Figure 5:
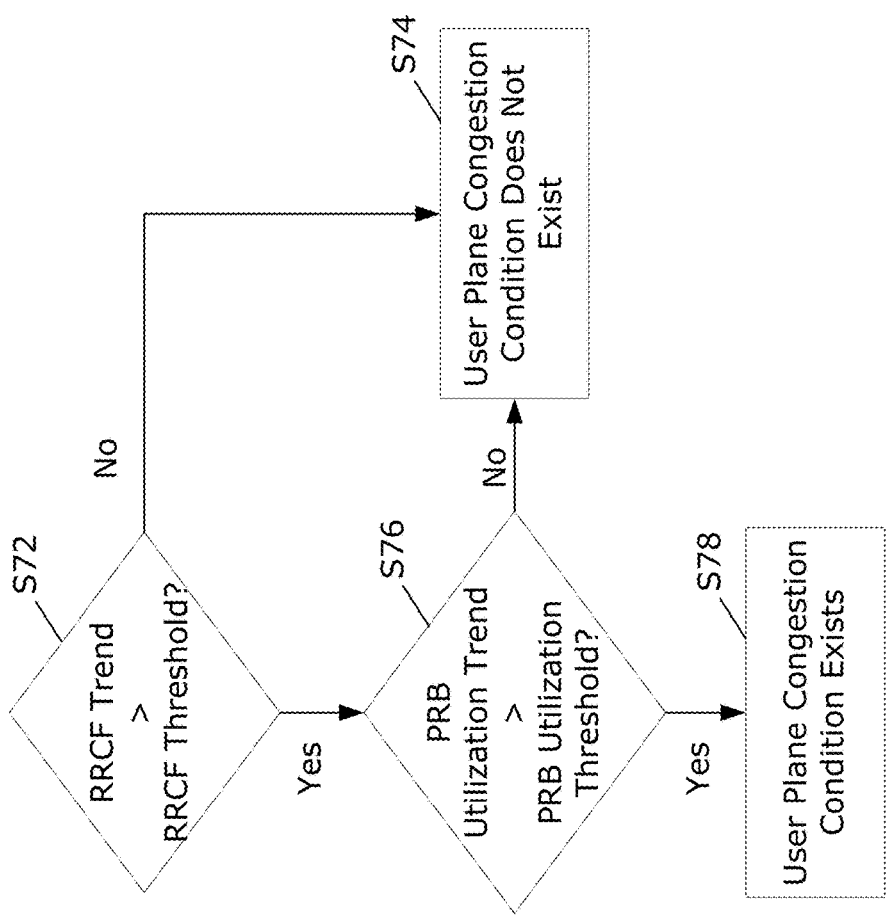
FIG. 5 is a process diagram depicting an example of another process performed to determine whether wireless communication congestion exists.

As discussed above in relation to FIGS. 2A-2B, near real time identification of wireless communication congestion is based on a relationship between a number of calculated KPI trend prediction values and corresponding KPI trend threshold values. FIGS. 4-5 depict processes performed to determine whether wireless communication congestion exists based on that relationship. Although the examples described in relation to FIGS. 4-5 reference specific KPI trend prediction values, this is only for simplicity.

FIG. 4 depicts a process for determining whether a radio access network (RAN) congestion condition exists. In one example, the RAN congestion condition is one form of wireless communication congestion. RAN congestion is, for example, an indication of how a base station 17 is loaded as well as how the base station 17 is responding to such load. In step S62, a RRCF trend prediction value is compared to a RRCF threshold value. The RRCF trend prediction value is calculated, for example, in the process of FIG. 2B. As discussed above, the RRCF trend prediction value is, for example, a prediction of how the rate of connection failures will change during an upcoming interval.

If the RRCF trend is not greater than the RRCF threshold, then the process proceeds to step S64. In step S64, it is determined that the RAN congestion condition does not exist. Otherwise, if the RRCF trend is greater than the RRCF threshold, the process proceeds to step S66. In step S66, a RRC utilization trend prediction value is compared to a RRC utilization threshold value. The RRC utilization trend prediction value is also calculated, for example, in the process of FIG. 2B. As discussed above, the RRC utilization trend prediction value is, for example, a prediction of how utilized, or loaded, a particular base station 17 will be during an upcoming interval.

If the RRC utilization trend is not greater than the RRC utilization threshold, then the process proceeds to step S64. In step S64, it is determined that the RAN congestion condition does not exist. Otherwise, if the RRC utilization trend is greater than the RRC utilization threshold, the process proceeds to step S68. In step S68, it is determined that the RAN congestion condition does exist. Thus, in one example, if the predicted RRCF rate (e.g., number of connection failures) is increasing beyond a RRCF threshold (e.g., RRCF trend>RRCF threshold) and the predicted RRC utilization (e.g., how a base station 17 is utilized or loaded) is increasing beyond a RRC utilization threshold (e.g., RRC utilization trend>RRC utilization threshold), then the RAN congestion condition exists. However, in this example, if both of these comparisons (e.g., RRCF trend>RRCF threshold and RRC utilization trend>RRC utilization threshold) are not true, then the RAN congestion condition does not exist.

FIG. 5 depicts a process, similar to the process of FIG. 4, for determining whether a user plane congestion condition exists. The user plane congestion condition is, for example, another form of wireless communication congestion. The user plane congestion condition provides, for example, an indication of how an airlink between mobile devices 13 and a base station 17 is utilized or loaded as well as how the base station 17 is responding to such utilization or load. In step S72, as with step S62 of FIG. 4, a RRCF trend prediction value is compared to a RRCF threshold value.

If the RRCF trend is not greater than the RRCF threshold, then the process proceeds to step S74. In step S74, it is determined that the user plane congestion condition does not exist. Otherwise, if the RRCF trend is greater than the RRCF threshold, the process proceeds to step S76. In step S76, a physical resource block (PRB) utilization trend prediction value is compared to a PRB utilization threshold value. As with the RRCF trend and RRC utilization trend, the PRB utilization trend prediction value is also calculated, for example, in the process of FIG. 2B. As discussed above, the PRB utilization trend prediction value is, for example, a prediction of how utilized, or loaded, an airlink between mobile devices 13 and a particular base station 17 will be during an upcoming interval.

If the PRB utilization trend is not greater than the PRB utilization threshold, then the process proceeds to step S74. In step S74, it is determined that the user plane congestion condition does not exist. Otherwise, if the PRB utilization trend is greater than the PRB utilization threshold, the process proceeds to step S78. In step S78, it is determined that the user plane congestion condition does exist. Thus, in one example, if the predicted RRCF rate (e.g., number of connection failures) is increasing beyond a RRCF threshold (e.g., RRCF trend>RRCF threshold) and the predicted PRB utilization (e.g., how an airlink between mobile devices 13 and a base station 17 is utilized or loaded) is increasing beyond a PRB utilization threshold (e.g., PRB utilization trend>PRB utilization threshold), then the user plane congestion condition exists. However, in this example, if both of these comparisons (e.g., RRCF trend>RRCF threshold and PRB utilization trend>PRB utilization threshold) are not true, then the user plane congestion condition does not exist.

Figure 6:
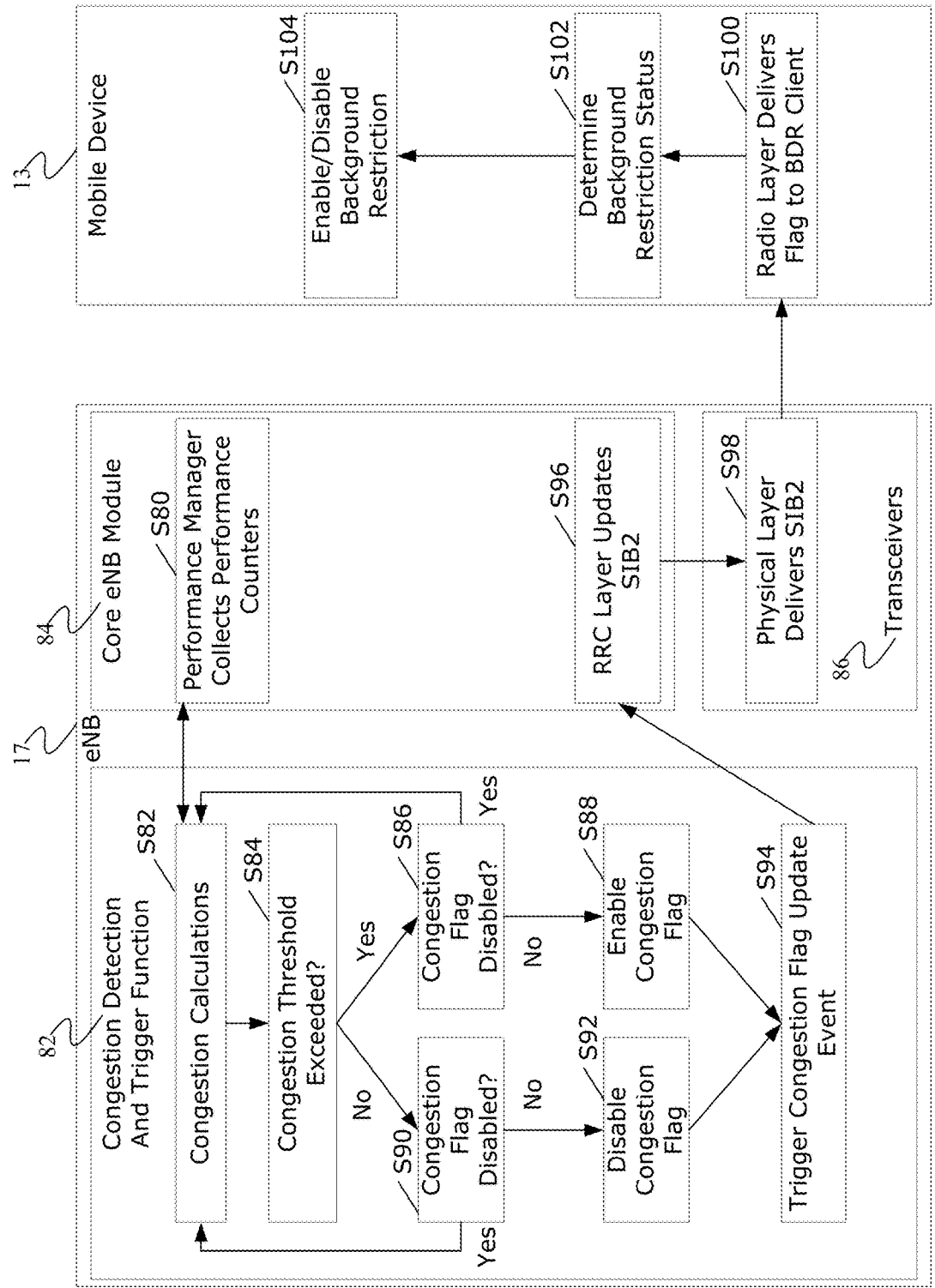
FIG. 6 is a functional block diagram depicting an example of elements of the system of FIG. 3 as well as an example of a process for near real time identification of wireless communication congestion and mobile device notification.

FIG. 6 illustrates a mobile device 13 and a base station 17 as well as a process for near real time identification of predicted wireless communication congestion and mobile device notification. The base station 17, in this example, includes a core eNodeB (or eNB) module 84 and a congestion detection and trigger function 82. The process starts within the core eNB module 84 with a performance manager (not shown) collecting, in step S80, performance counters. Step S80 is, for example, similar to step S20 of FIG. 2A. In step S82, the congestion detection and trigger function 82 receives the collected performance counters and performs congestion calculations. Step S82 is, for example, similar to steps S22 of FIG. 2A and S24 of FIG. 2B.

The congestion detection and trigger function 82, in step S84, determines whether a congestion threshold is exceeded. Step S84 is, for example, similar to step S26 and includes, for example, the processes depicted in FIGS. 4-5. Similar to steps S28 and S30 of FIG. 2B, step S86 determines whether a congestion flag is already enabled and step S88 enables the congestion flag, if not already enabled. Likewise, similar to steps S32 and S34 of FIG. 2B, step S90 determines whether the congestion flag is already disabled and step S92 disables the congestion flag, if not already disabled. That is, in response to a determination that predicted wireless communication congestion exists in step S84, congestion detection and trigger function 82 enables the congestion flag, if not already enabled (steps S86 and S88). Similarly, in response to a determination that a predicted reduction and/or end of wireless communication congestion exists in step S84, congestion detection and trigger function 82 disables the congestion flag, if not already disabled (steps S90 and S92). Then, if a change to the congestion flag occurred (e.g., enabled in step S88 or disabled in step S92), congestion detection and trigger function 82, in step S94, triggers a congestion flag update event.

In step S96, a RRC layer (not shown), within core eNB module 84, updates the congestion flag within a system information broadcast 2 (SIB2) message. The SIB2 message is, for example, a control message used by the base station 17 to provide operational information to mobile device 13. Thus, in one example, base station 17 utilizes a SIB2 message to notify mobile device 13 of a change in predicted wireless communication congestion.

A physical layer, represented as transceivers 86 within the eNB 17, delivers, in step S98, the SIB2 message to mobile device 13. Mobile device 13 receives the SIB2 message and, in step S100, a radio layer within mobile device 13 delivers the congestion flag from the SIB2 message to a background data restriction (BDR) client (not shown).

The BDR client, in step S102, determines whether or not a background application data communication restriction is active. In step S104, based on the status determination of step S102 and the congestion flag, the BDR client enables or disables the background application data communication restriction. For example, if the background application data communication restriction is active and the congestion flag is disabled, then the BDR client disables the background application data communication restriction. In an alternate example, if the background application data communication restriction is not active and the congestion flag is enabled, then the BDR client enables the background application data communication restriction.

Figure 7:
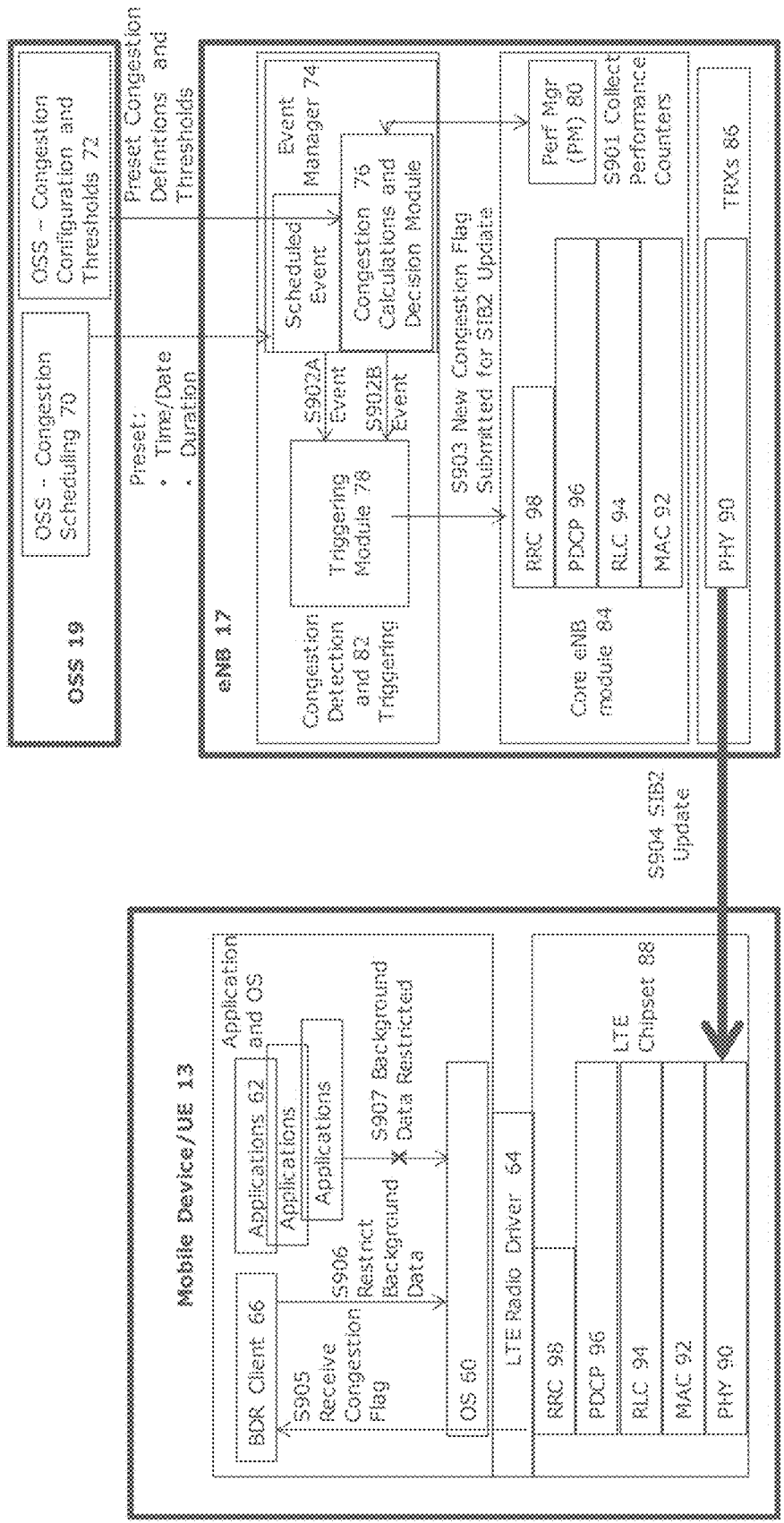
FIG. 7 is a functional block diagram depicting an example of the elements of FIG. 6 with some greater detail, including an example of physical and logical layers involved in a process of near real time identification of wireless communication congestion and mobile device notification.

FIG. 7 illustrates the mobile device 13 and eNB 17, as referenced in FIG. 6, with some greater detail, including, for example, the physical and logical layers involved in near real time identification of predicted wireless communication congestion and mobile device notification. As can be seen, mobile device 13 includes, for example, an operating system 60, applications 62, a long term evolution (LTE) radio driver 64 and a background data restriction (BDR) client 66. Mobile device 13 also includes, for example, a LTE chipset 88. The LTE chipset 88 is, for example, a component within mobile device 13 that facilitates wireless communication via an airlink with base station 17.

Similar to FIG. 6, base station 17 includes, for example, core eNB module 84 and congestion detection and triggering function 82. Base station 17 also includes, for example, transceivers 86. Transceivers 86, similar to LTE chipset 88, is a component within base station 17 that facilitates wireless communication via the airlink with mobile device 13. Unlike LTE chipset 88, however, transceivers 86 typically rely, for example, on core eNB module 84 to fully process wireless communication. Core eNB module 84 includes, for example, performance manager 80.

FIG. 7 also illustrates an operation support system (OSS) 19 configured, for example, to provide management and operational support to base station 17. OSS 19 includes, for example, OSS congestion scheduling 70 and OSS congestion configuration and thresholds 72. In one example, OSS congestion scheduling 70 provides preset values (e.g., time/date, duration) to an event manager 74 of congestion detection and triggering function 82. These preset values, for example, define when and/or how often congestion detection calculations, such as those described above in relation to FIGS. 2A-2B and 4-5, are performed. In a further example, OSS congestion configuration and thresholds 72 provides preset congestion definitions and thresholds (e.g., KPI trend threshold values) to a congestion calculations and decision module 76 within event manager 74.

Wireless communications is, for example, performed by various logical layers including physical (PHY) 90, media access control (MAC) 92, radio link control (RLC) 94, packet data convergence protocol (PDCP) 96 and radio resource control (RRC) 98. While LTE chipset 88 typically implements all of these layers within mobile device 13, PHY 90 is implemented by transceivers 86 and the remaining layers are implemented by core eNB module 84 within base station 17.

Furthermore, FIG. 7 depicts a process, similar to the process of FIG. 6, for near real time identification of predicted wireless communication congestion and mobile device notification. In step S901, performance manager 80 collects performance counters or measurements. Such collection occurs, for example, at repetitive intervals. In one example, each repetitive interval is a fixed amount of time. As part of step S902B, congestion calculations and decision module 76 receives the collected performance measurements and determines whether a change in predicted wireless communication congestion exists. Such determination is performed, for example, as described above. If a change in predicted wireless communication congestion exists, triggering module 78 is notified, for example, as part of step S902B.

While near real time identification of predicted wireless communication congestion is performed over time, as described in the various examples above, a particular event may be scheduled and known to cause wireless communication congestion. Thus, as part of step S902A, event manager 74 may receive, for example, an indication of such scheduled event from OSS congestion scheduling 70 and notify triggering module 78 at the appropriate time.

In step S903, triggering module 78 delivers an updated congestion flag to core eNB module 84 to be included in a SIB2 message. Transceivers 86, in step S904, include the updated congestion flag in the SIB2 message and deliver the SIB2 message to mobile device 13. Mobile device 13, in step S905, receives the SIB2 message, extracts the updated congestion flag, and delivers the updated congestion flag to the BDR client 66.

In one example, the updated congestion flag is enabled and notifies mobile device 13 of an identification of newly predicted wireless communication congestion. Mobile device 13, in this example, activates a background application data communication restriction in step S906. As a result, in step S907, background application data communication is restricted by mobile device 13. In an alternate example (not shown), the updated congestion flag is disabled and notifies mobile device 13 of an identified reduction and/or end of predicted wireless communication congestion. Mobile device 13, in this alternate example, deactivates the background application data communication restriction and background applications are permitted to perform data communication.

Figure 8:
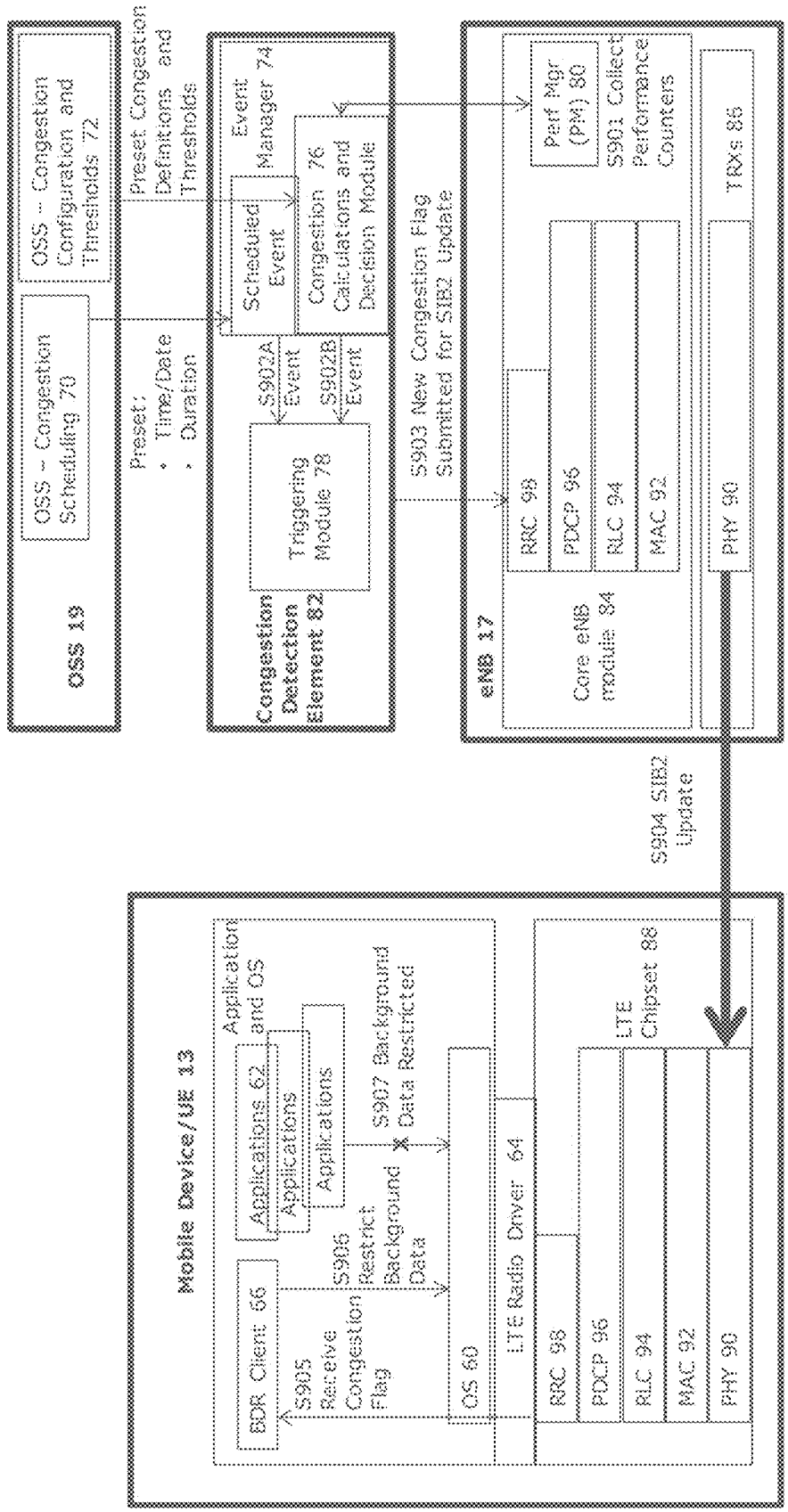
FIG. 8 is a functional block diagram depicting an example of the elements of FIG. 7 in a somewhat different physical relationship.

FIG. 8 is similar to FIG. 7 and like elements are referenced with like numerals. Unlike FIG. 7, however, FIG. 8 depicts congestion detection element 82 as separate and distinct from, yet coupled or otherwise interconnected to, base station 17. Congestion detection element 82 includes, for example, triggering module 78 and event manager 74. Thus, in one example (e.g., FIG. 7), congestion detection and triggering 82 as well as core eNB module 84 are contained in base station 17. Meanwhile, in another example (e.g., FIG. 8), congestion detection 82 is not contained in base station 17, but remains coupled or otherwise interconnected to base station 17.

As shown by the description above, near real time identification of wireless communication congestion may be implemented on servers and/or wireless network nodes. Although special-built hardware may be used, server and/or wireless network functions often are implemented by appropriate programming to configure one or more general-purpose computer platforms that have interfacing to support communications via the particular network(s).

FIG. 9 provides a functional block diagram illustration of a general purpose computer hardware platform. More specifically, FIG. 9 illustrates a network or host computer platform, as may typically be used to implement a server, such as application server 25, congestion detection 82 and/or any of the other servers/platforms implementing near real time identification of wireless communication congestion. FIG. 10 depicts a computer with user interface elements, as may be used to implement a personal computer or other type of work station or terminal device, although the computer of FIG. 10 may also act as a server if appropriately programmed. FIG. 11 depicts a system with one or more wireless transceivers, as may be used to implement a wireless network node, such as eNodeB 17 in FIG. 3. It is believed that the general structure and general operation of such equipment as shown in FIGS. 9-11 should be self-explanatory from the high-level illustrations.

A server, for example, includes a data communication interface for packet data communication (see FIG. 9). The server also includes processor hardware implementing a central processing unit (CPU), in the form of circuitry of one or more processors, for executing program instructions. The server platform typically includes an internal communication bus, program storage, and data storage for various data files to be processed and/or communicated by the server, although the server often receives programming and data via network communications. The hardware elements, operating systems and programming languages of such servers are conventional in nature, and it is presumed that those skilled in the art are adequately familiar therewith. Of course, the server functions may be implemented in a distributed fashion on a number of similar platforms, to distribute the processing load. The software programming relating to the near real time identification of wireless communication identification techniques discussed herein may be downloaded and/or updated from a computer platform, for example, to configure the eNodeB 17, congestion detection 82 or other server (e.g. FIG. 3) or from a host computer or the like communicating with the mobile device via the network (e.g. FIG. 3).

A computer type user terminal device, such as a PC or tablet computer, similarly includes a data communication interface, processing circuitry forming a CPU, main memory and one or more mass storage devices for storing user data and the various executable programs (see FIG. 10). A mobile device type user terminal may include similar elements, but will typically use smaller components that also require less power, to facilitate implementation in a portable form factor. The various types of user terminal devices will also include various user input and output elements. A computer, for example, may include a keyboard and a cursor control/selection device such as a mouse, trackball, joystick or touchpad; and a display for visual outputs. A microphone and speaker enable audio input and output. Some smartphones include similar but smaller input and output elements. Tablets and other types of smartphones utilize touch sensitive display screens, instead of separate keyboard and cursor control elements. The hardware elements, operating systems and programming languages of such user terminal devices also are conventional in nature.

A wireless network node, such as an evolved node B, also includes a data communication interface, CPU, main memory and storage for data and/or programming (see FIG. 11). In addition, such wireless network node includes one or more wireless transceivers in order to provide communications services to one or more mobile devices via various radio frequencies in compliance with one or more wireless communications standards (e.g., LTE). Although FIG. 11 depicts the system enclosed within a single structure, such physical structure is not required. Alternatively, or in addition, certain components may be located, either physically or logically, within disparate elements. For example, while the wireless network node includes the data communication interface and wireless transceiver(s), processing to control such communication interfaces may be implemented by a CPU and programming stored in a memory of another device, such as MME 52.

Hence, aspects of near real time identification of wireless communication congestion outlined above may be embodied in programming. Program aspects of the technology may be thought of as "products" or "articles of manufacture" typically in the form of executable code and/or associated data that is carried on or embodied in a type of machine readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of the other network 39 into the computer platform of the mobile network node 41, or from a host server into a mobile device 13. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to "non-transitory", "tangible", or "storage" media, terms such as computer or machine "readable medium" refer to any medium that participates in providing instructions to a processor for execution.

Hence, a machine readable medium may take many forms, including but not limited to, a tangible storage medium, a carrier wave medium or physical transmission medium. Non-volatile storage media include, for example, optical or magnetic disks, such as any of the storage devices in any computer(s) or the like, such as may be used to implement the mobile network node 41, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media can take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer can read programming code and/or data. Many of these forms of computer readable media may be involved in carrying one or more sequences of one or more instructions to a processor for execution.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A device, comprising:
one or more memory devices to store instructions; and
one or more processors to execute the instructions to:
receive, from a performance manager and at repetitive intervals of fixed length, performance measurement values representing performance of wireless communication through a mobile communication base station;
obtain key performance indicators (KPIs) corresponding to each interval,
at least one of the KPIs being calculated based on the performance measurement values received at each interval;
calculate, based on a number of past intervals and the KPIs corresponding to each past interval of the number of past intervals, a plurality of KPI trend prediction values representing predicted future KPIs;
determine whether or not the mobile communication base station is predicted to be subject to wireless communication congestion based on a relationship between the plurality of KPI trend prediction values and a plurality of corresponding KPI trend threshold values; and
responsive to the determination, notify mobile devices currently being served by the mobile communication base station of a result of the determination when a change in a state of predicted wireless communication congestion is identified,
the mobile devices being instructed to activate a background application restriction when the mobile communication base station is predicted to be congested, or
the mobile devices being instructed to de-activate the background application restriction when the mobile communication base station is predicted to not be congested.

2. The device of claim 1, wherein the received performance measurement values include:
a total radio resource control (RRC) connection failure (RRCF) value representing a total number of RRCF events experienced by the mobile communication base station during each interval;
a total RRC connection success (RRCS) value representing a total number of RRCS events experienced by the mobile communication base station during each interval; and
a total RRC connected user (RRCC) value representing a total number of mobile devices wirelessly connected to the mobile communication base station during each interval.

3. The device of claim 2, wherein:
a maximum number of RRCC (RRCM) values represent a fixed maximum number of mobile devices to which the mobile communication base station is capable of providing wireless connections; and
the one or more processors, when obtaining the KPIs corresponding to each interval, are to calculate for each interval at least one of:
a RRCF rate for each interval as (RRCF/(RRCF+RRCS))*100, or
a RRC utilization for each interval as (RRCC/RRCM)*100.

4. The device of claim 3, wherein the one or more processors, when calculating the plurality of KPI trend prediction values, are to calculate at least one of:
a RRCF rate trend prediction value for a number of future intervals based on the RRCF rate for each of the number of past intervals; or
a RRC utilization trend prediction value for the number of future intervals based on the RRC utilization for each of the number of past intervals.

5. The device of claim 4, wherein the one or more processors, when determining whether or not the mobile communication base station is predicted to be subject to wireless communication congestion, are to:
determine whether or not the relationship between the RRCF rate trend prediction value and a RRCF rate threshold meets a first predetermined condition;
determine whether or not the relationship between the RRC utilization trend prediction value and a RRC utilization threshold meets a second predetermined condition; and
upon a determination that the first predetermined condition is met and the second predetermined condition is met, determine that the mobile communication base station is predicted to be subject to wireless communication congestion.

6. The device of claim 2, wherein:
a maximum number of RRCC (RRCM) value represents a fixed maximum number of mobile devices to which the mobile communication base station is capable of providing wireless connections; and
the one or more processors, when obtaining the KPIs corresponding to each interval, are to:
calculate a RRCF rate for each interval as (RRCF/(RRCF+RRCS))*100, and
receive a downlink calculated physical resource block (PRB) load (DLPRBU) for each interval.

7. The device of claim 6, wherein the one or more processors, when calculating the plurality of KPI trend prediction values, are to calculate:
a RRCF rate trend prediction value for a number of future intervals based on the RRCF rate for each of the number of past intervals; and
a DLPRBU trend prediction value for the number of future intervals based on the DLPRBU for each of the number of past intervals.

8. The device of claim 7, wherein the one or more processors, when determining whether or not the mobile communication base station is predicted to be subject to wireless communication congestion, are to:

determine whether or not the relationship between the RRCF rate trend prediction value and a RRCF rate threshold meets a first predetermined condition;
determine whether or not the relationship between the DLPRBU trend prediction value and a DLPRBU threshold meets a second predetermined condition; and
upon a determination that the first predetermined condition is met and the second predetermined condition is met, determine that the mobile communication base station is predicted to be subject to wireless communication congestion.

9. The device of claim 1, wherein each KPI trend prediction value is calculated based on linear regression using a formula $|\alpha|*(n+\Delta)+\beta$, wherein:

$$\alpha = \left[n * \sum_{i=1}^{n}(x_i y_i) - \left(\sum_{i=1}^{n}(x_i) * \sum_{i=1}^{n}(y_i)\right)\right] \bigg/ \left(n * \sum_{i=1}^{n}(x_i^2) - \left(\sum_{i=1}^{n}(x_i)^2\right)\right)$$

and represents a slope of calculated KPI trend values;

$$\beta = \left[\sum_{i=1}^{n}(y_i) - \left(\alpha * \sum_{i=1}^{n}(x_i)\right)\right] \bigg/ n$$

and represents an offset;
n is the number of past intervals;
x is an ordinal value representing a position of each interval of the number of past intervals in a series of the number of past intervals;
y is each one KPI corresponding to the KPI trend prediction value being calculated and corresponding to each interval of the number of past intervals; and
$\Delta$ is 2 if $\alpha >= 0$ or 1 if $\alpha < 0$.

10. A system, comprising:
a wireless data communication congestion detector configured to be coupled to at least one mobile communication base station, comprising:
one or more memory devices to store instructions; and
one or more processors to execute the instructions to:
receive, from at least one performance manager and at repetitive intervals of fixed length, performance measurement values representing performance of wireless communication through the at least one mobile communication base station;
obtain key performance indicators (KPIs) corresponding to each interval,
at least one of the KPIs being calculated based on the performance measurement values received at each interval;
calculate, based on a number of past intervals and the KPIs corresponding to each past interval of the number of past intervals, a plurality of KPI trend prediction values representing predicted future KPIs;
determine whether or not the at least one mobile communication base station corresponding to the at least one performance manager is predicted to be subject to wireless data communication congestion based on a relationship between the plurality of KPI trend prediction values and a plurality of corresponding KPI trend threshold values; and
responsive to the determination, notify mobile devices currently being served by the at least one mobile communication base station corresponding to the at least one performance manager of a result of the determination when a change in a state of predicted wireless communication congestion is identified,
the mobile devices being instructed to activate a background application restriction when the at least one mobile communication base station is predicted to be congested, or
the mobile devices being instructed to de-activate the background application restriction when the at least one mobile communication base station is predicted to not be congested.

11. The system of claim 10, wherein the received performance measurement values include:
a total radio resource control (RRC) connection failure (RRCF) value representing a total number of RRCF events experienced by the at least one mobile communication base station during each interval;
a total RRC connection success (RRCS) value representing a total number of RRCS events experienced by the at least one mobile communication base station during each interval; and
a total RRC connected user (RRCC) value representing a total number of mobile devices wirelessly connected to the at least one mobile communication base station during each interval.

12. The system of claim 11, wherein:
a maximum number of RRCC (RRCM) value represents a fixed maximum number of mobile devices to which the at least one mobile communication base station is capable of providing wireless connections; and
the one or more processors, when obtaining the KPIs corresponding to each interval, are to calculate for each interval at least one of:
a RRCF rate for each interval as (RRCF/(RRCF+RRCS))*100, or
a RRC utilization for each interval as (RRCC/RRCM)*100.

13. The system of claim 12, wherein the one or more processors, when calculating the plurality of KPI trend prediction values, are to calculate at least one of:
a RRCF rate trend prediction value for a number of future intervals based on the RRCF rate for each of the number of past intervals; or
a RRC utilization trend prediction value for the number of future intervals based on the RRC utilization for each of the number of past intervals.

14. The system of claim 13, wherein the one or more processors, when determining whether or not the at least one mobile communication base station corresponding to the at least one performance manager is predicted to be subject to wireless data communication congestion, are to:
determine whether or not the relationship between the RRCF rate trend prediction value and a RRCF rate threshold meets a first predetermined condition;
determine whether or not the relationship between the RRC utilization trend prediction value and a RRC utilization threshold meets a second predetermined condition; and
upon a determination that the first predetermined condition is met and the second predetermined condition is met, determine that each respective mobile communication base station corresponding to the at least one performance manager is predicted to be subject to wireless data communication congestion.

15. The system of claim 11, wherein:
a maximum number of RRCC (RRCM) value represents a fixed maximum number of mobile devices to which each respective mobile communication base station is capable of providing wireless connections; and
the one or more processors, when obtaining the KPIs corresponding to each interval, are to:
calculate a RRCF rate for each interval as (RRCF/(RRCF+RRCS))*100; and
receive a downlink calculated physical resource block (PRB) load (DLPRBU) for each interval.

16. The system of claim 15, wherein the one or more processors, when calculating the plurality of KPI trend prediction values, are to calculate:
a RRCF rate trend prediction value for a number of future intervals based on the RRCF rate for each of the number of past intervals; and
a DLPRBU trend prediction value for the number of future intervals based on the DLPRBU for each of the number of past intervals.

17. The system of claim 16, wherein the one or more processors, when determining whether or not the at least one mobile communication base station corresponding to the at least one performance manager is predicted to be subject to wireless data communication congestion, are to:
determine whether or not the relationship between the RRCF rate trend prediction value and a RRCF rate threshold meets a first predetermined condition;
determine whether or not the relationship between the DLPRBU trend prediction value and a DLPRBU threshold meets a second predetermined condition; and
upon a determination that the first predetermined condition is met and the second predetermined condition is met, determine that each respective mobile communication base station corresponding to the at least one performance manager is predicted to be subject to wireless data communication congestion.

18. The system of claim 10, wherein each KPI trend prediction value is calculated based on linear regression using a formula $|\alpha|*(n+\Delta)+\beta$, wherein:

$$\alpha = \left[n*\sum_{i=1}^{n}(x_iy_i) - \left(\sum_{i=1}^{n}(x_i)*\sum_{i=1}^{n}(y_i)\right)\right] \bigg/ \left(n*\sum_{i=1}^{n}(x_i^2) - \left(\sum_{i=1}^{n}(x_i)^2\right)\right)$$

and represents a slope of calculated KPI trend values, $$\beta = \left[\sum_{i=1}^{n}(y_i) - \left(\alpha*\sum_{i=1}^{n}(x_i)\right)\right] \bigg/ n$$

and represents an offset,
n is the number of past intervals,
x is an ordinal value representing a position of each interval of the number of past intervals in a series of the number of past intervals,
y is each one KPI corresponding to the KPI trend prediction value being calculated and corresponding to each interval of the number of past intervals, and
$\Delta$ is 2 if $\alpha>=0$ or 1 if $\alpha<0$.

19. A mobile communication base station, comprising:
a processor configured to control operations of the mobile communication base station;
a memory coupled to the processor;
a performance manager program stored in the memory, wherein execution of the performance manager program causes the performance manager program to collect performance measurements of the mobile communication base station at repetitive intervals of fixed length, the collected performance measurements including:
a total radio resource control (RRC) connection failure (RRCF) value representing a total number of RRCF events experienced by the mobile communication base station during each interval;
a total RRC connection success (RRCS) value representing a total number of RRCS events experienced by the mobile communication base station during each interval; and
a total RRC connected user (RRCC) value representing a total number of mobile devices wirelessly connected to the mobile communication base station during each interval; and
a congestion detector program stored in the memory, wherein execution of the congestion detector program causes the congestion detector program to:
receive from the performance manager, after each interval, the collected performance measurements and obtain a maximum number of RRCC (RRCM) value representing a fixed maximum number of mobile devices to which the mobile communication base station is capable of providing wireless connections;
obtain key performance indicators (KPIs) corresponding to each interval, at least one of the KPIs being calculated based on the received performance measurements;
calculate, based on a number of past intervals and the KPIs corresponding to each past interval of the number of past intervals, a plurality of KPI trend prediction values representing predicted future KPIs, the KPI trend prediction values including at least two of:
a RRCF rate trend prediction value based on a RRCF rate KPI for each interval calculated as (RRCF/(RRCF+RRCS))*100;
a RRC utilization trend prediction value based on a RRC utilization KPI for each interval calculated as (RRCC/RRCM)*100; and
a downlink calculated physical resource block (PRB) load (DLPRBU) trend prediction value based on the DLPRBU for each interval;
determine whether or not the mobile communication base station is predicted to be subject to wireless data communication congestion based on a relationship between the calculated plurality of KPI trend prediction values and corresponding KPI trend threshold values; and
responsive to the determination, notify mobile devices currently being served by the mobile communication base station of a result of the determination when a change in a state of predicted wireless communication congestion is identified.

20. The mobile communication base station of claim 19, wherein each KPI trend prediction value is calculated based on linear regression using a formula $|\alpha|*(n+\Delta)+\beta$, wherein:

$$\alpha = \left[ n * \sum_{i=1}^{n} (x_i y_i) - \left( \sum_{i=1}^{n} (x_i) * \sum_{i=1}^{n} (y_i) \right) \right] \bigg/ \left( n * \sum_{i=1}^{n} (x_i^2) - \left( \sum_{i=1}^{n} (x_i)^2 \right) \right)$$

and represents a slope of calculated KPI trend values;

$$\beta = \left[ \sum_{i=1}^{n} (y_i) - \left( \alpha * \sum_{i=1}^{n} (x_i) \right) \right] \bigg/ n$$

and represents an offset;
- n is the number of past intervals;
- x is an ordinal value representing a position of each interval of the number of past intervals in a series of the number of past intervals;
- y is each one KPI corresponding to the KPI trend prediction value being calculated and corresponding to each interval of the number of past intervals; and
- Δ is 2 if α>=0 or 1 if α<0.

\* \* \* \* \*